Sept. 16, 1969  SHIRO OGURI  3,467,160
TIRE HAVING SUB-TIRES INTEGRAL WITH ITS SIDEWALLS
Filed July 14, 1966  3 Sheets-Sheet 3

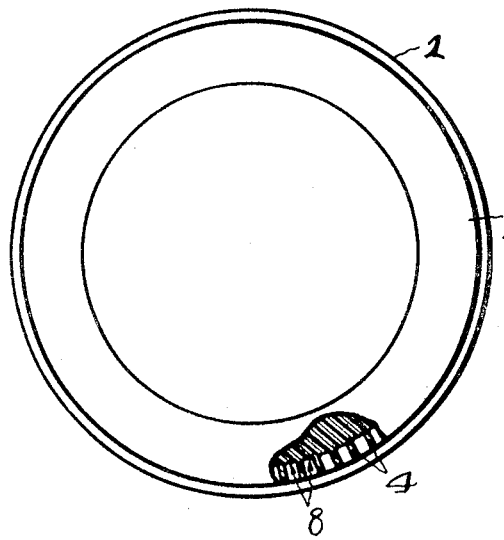
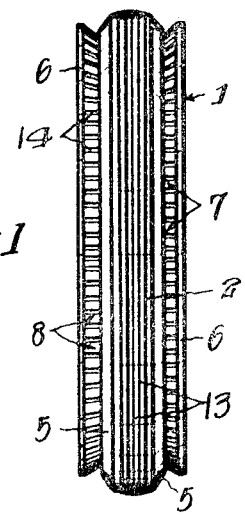
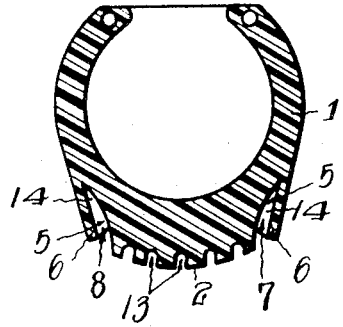
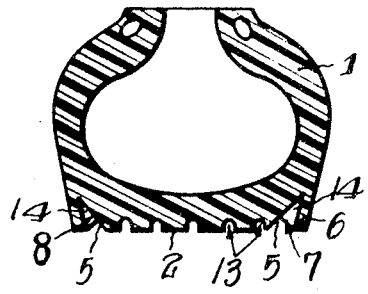
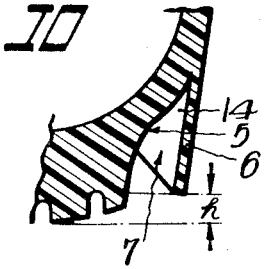

United States Patent Office 3,467,160
Patented Sept. 16, 1969

3,467,160
TIRE HAVING SUB-TIRES INTEGRAL WITH
ITS SIDEWALLS
Shiro Oguri, 2 Koyama-cho, Shiba Mita, Minato-ku,
Tokyo, Japan
Filed July 14, 1966, Ser. No. 565,187
Claims priority, application Japan, May 4, 1966,
41/27,920
Int. Cl. B60c 9/02, 13/00, 11/00
U.S. Cl. 152—352                            1 Claim

ABSTRACT OF THE DISCLOSURE

The present tire comprises a pair of sub-tires, each of which is integral with one of the sidewalls and has a continuous periphery the diameter of which is greater than the internal diameter of the tread portion of the tire. The lateral width of each sub-tire is not greater than the thickness of the sidewall, and the tread portion of the tire has a ground-contacting surface that extends across the full width of the tread portion between the sidewalls. The peripheral diameter of each sub-tire is less than that of the ground-contacting surface of the tire tread, but is great enough so that during normal running of the tire at full inflation, deformation of the tire which occurs particularly in stopping, starting and negotiating curves brings the sub-tires into load-bearing contact with the ground.

Background of the invention

This invention relates to a tire for use with vehicles such as automobiles, airplanes and so forth.

When a tire rolls on the ground, that portion of the tire which contacts the ground is deformed due to a load imparted thereto, so that the tire is subject to a pulling force, compression and shearing force. This will cause abrasion, temperature rise, and fatigue of the tire. In addition, the tire is not only subject to the influence of gravity as the vehicle runs on the ground, but also it is subject to a variety of forces such as centrifugal force, air pressure applied hereto from the sides and inertia force by acceleration or deceleration when the vehicle travels around curves. However, it is required that these forces be transferred to the ground through the rotating tire so that the running direction of the vehicle which the driver wishes can be accurately maintained by the tire. Sideslip of the vehicle takes place most frequently when the running direction of the vehicle which is running straight is changed. Also, such phenomenon will easily occur when the rotational frequencies of the front and rear wheels are different from each other. In other words, when the vehicle starts a curving motion, it is subject to a centrifugal force, and therefore each of the tires must produce a centripetal force to counterbalance the centrifugal force. Furthermore, when the vehicle starts or stops, the tires of the rear or front wheels are deformed. Namely, since the weight of the vehicle per se plus the running load (this load varies in accordance with the velocity when the vehicle is to stop) is imparted to the tires when the wheels of the vehicle are braked to stop, the load is temporarily increased, thus imparting an unreasonable impact to the tires.

Summary of the invention

Accordingly, it is an object of this invention to prevent sideslip of the tires of a running automobile or an airplane which is gliding on the ground so as to maintain the driving stability and directional stability.

Another object of this invention is to prevent heat from being produced by the rolling resistance of the tire, thereby minimizing the damage to the tire.

Still another object of this invention is to provide a tire for use with a vehicle such as automobiles, airplanes, and so forth, said tire comprising a main tire body and sub-tires formed integrally therewith having a slightly smaller diameter than the outer periphery of the main tire body and arranged in such a manner that grooves are defined between the main tire body and the sub-tires, so that a tendency of the temperature of the main tire body to rise can be effectively restrained by the cooling effect of the air flowing through the gaps or grooves defined between the main tire body and the sub-tires.

A further object of this invention is to permit detection of the abrasion degree of the main tire body in accordance with the height of the outer peripheral surfaces of the sub-tires from the periphery of the main tire body, so that the life span of the tire can be increased by repairing the main tire body and by changing the mounting position of the tire. The sub-tires also are useful for preventing pebbles and muddy water from being scattered inside and outside of the tire.

Still a further object of this invention is to provide a tire provided on both side surfaces with radiator blades and sub-tires outside of the blades, thereby increasing the radiating and cooling effect of the tire during its high speed rotation.

Other objects and advantages of this invention will become apparent from the following description taken in conjunction with the accompanying drawings, in which:

Brief description of the drawing

FIG. 6 is a front view, partly cut-away, of another embodiment of this invention which is adapted to provide for a cooling effect;

FIG. 7 is a side view thereof;

FIG. 8 is an enlarged sectional view thereof;

FIG. 9 is an enlarged sectional view showing the ground contacting surface of the tire deformed by a load imparted thereto;

FIG. 10 is a partial enlarged sectional view;

Description of the preferred embodiments

With reference to FIGS. 1 through 5, a main tire body 1 has a circular ground-contacting surface 2 which in section becomes higher toward its center. Also, on both sides of the main tire body, sub-tires 3 are provided integrally therewith, which are smaller in diameter by $h$ than the outer peripheral surface of the main tire body. Grooves 4 are defined between the sub-tires 2 and the main tire body 1.

Figure 12A:
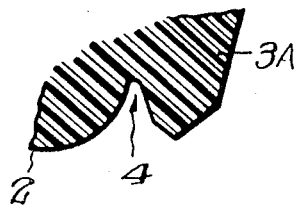
FIGS. 12A, B and C are sectional views of modifications of the sub-tire portion of this invention.
Figure 12B:
Figure 12C:
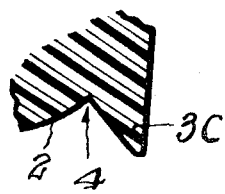

The outer peripheral surface of each of the sub-tires can assume any suitable configuration. FIG. 12 shows desired examples: 3A is the case where an inverted V-shaped projection is formed in the outer peripheral surface so as to extend therealong, 3B is the case where a projection having an approximately semicircular section is provided on the surface so as to extend therealong, and 3C is the case where the outer side surface is formed as a vertical surface and the inner side surface is tapered.

With reference to FIGS. 6 through 10, the reference numeral 1 represents a main tire body having a circular ground contacting surface 2 which becomes progressively higher toward its center. In the ground contacting surface 2, there are provided slip preventing grooves 13 configured into a predetermined shape. The reference numeral 5 indicates rising surfaces contiguous with the edges of the circular ground contacting surface of the main tire body 1. In the rising surfaces 5 are provided a plurality of radiator blades 14 spaced apart from each other a predetermined distance and extending radially outwardly with respect to the center of the main tire body 1. Between the bottom surface of each radiator blade and the circular ground contacting surface a radially distance $h$ is maintained. These radiator blades may take any suitable configuration such as slanted or arcuately curved, instead of taking the aforementioned radial configuration. The reference numeral 6 shows sub-tires integrally provided outside of the radiator blades 14, the radially inner portions of the sub-tires being fixed to the outer side surfaces of the main tire body 1 so that radiator chambers 7 and 8 are defined by the main tire body 1, radiator blades 14 and sub-tires 6 at the outer side surfaces of the main tire body 1.

Figure 11:
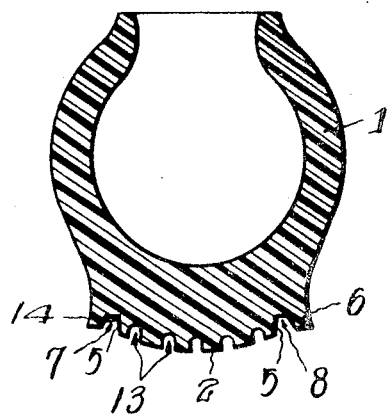
FIG. 11 is a sectional view of a third embodiment of this invention.

FIG. 11 is a sectional view of a modification showing the slip preventing grooves 13 provided in the outer surface of the main tire body and showing sub-tires 6.

Figure 1:
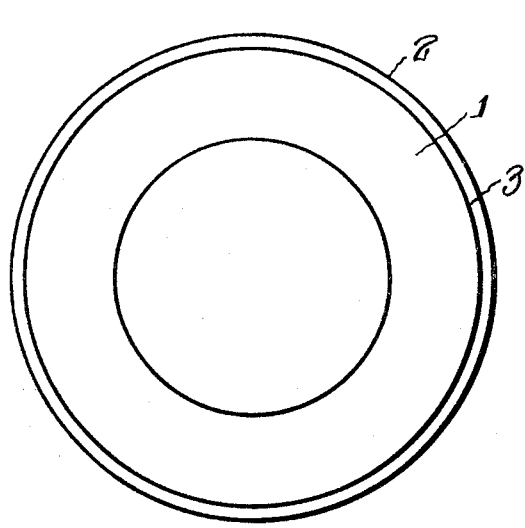
FIG. 1 is a front view of an embodiment of this invention.
Figure 2:
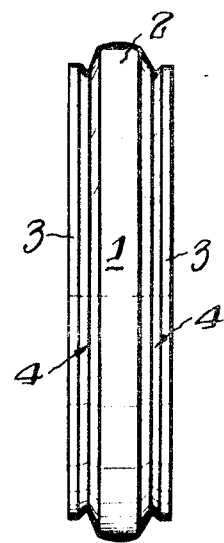
FIG. 2 is a side view thereof.
Figure 3:
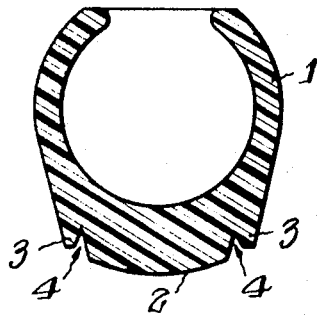
FIG. 3 is an enlarged sectional view thereof.
Figure 4:
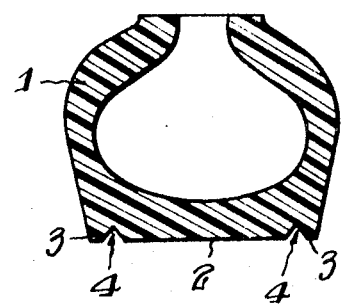
FIG. 4 is an enlarged sectional view illustrating the tire of this invention when the ground-contacting portion is deformed by a load imparted thereto.
Figure 5:
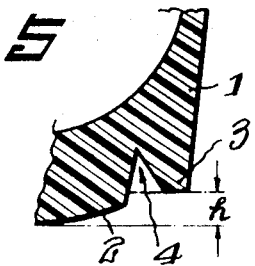
FIG. 5 is a partial enlarged sectional view thereof.

The tires of an automobile which is running with a high speed will be deformed at their ground contacting surfaces, as shown in FIGS. 4 and 9, leading to abrasion of the tires, temperature rise, and fatigue of the rubber composition. In accordance with this invention, however, provision of the sub-tires on both sides of each main tire body permits the load applied to the tires to be shared by the sub-tires, thus minimizing damage of the main tire body and slipping motion. In addition, abrasion of the outer peripheral surfaces of the tires is minimized.

A resilient material such as rubber is more greatly deformed than a rigid material such as metal by a smaller stress, and in the case of such a resilient material, energy loss such as hysteresis loss occurring due to its internal viscosity becomes higher, thus producing a greater amount of heat with less stress. Consequently, a tire formed of rubber material is subject to flexure with a load imparted thereto, and thus heat is produced in the internal portion of the tire after repeated application of a stress thereto when the vehicle runs.

Moreover, since the heat transfer of a rubber material is poor, temperature will rise, which causes deterioration of organic materials such as the cord and rubber forming the tire which are then susceptible to deterioration by moisture.

In the case of the tire according to this invention, however, not only a high air circulation is provided, but also distortion in the main tire body is minimized by means of the sub-tires provided on both sides of the main tire body, so that the hysteresis loss can be minimized, thus decreasing heat produced in the tire.

When the vehicle starts a curving movement, there is a tendency of the center of gravity of the main tire body 1 to shift so that the area of the ground contacting surface becomes smaller. In accordance with this invention, however, the sub-tires provided on both sides of the main tire body contact the ground, so that a larger contact surface can be maintained, thereby facilitating handling of the vehicle.

Furthermore, radiator blades may be provided between the sub-tires and the main tire body, so that any temperature rise in the main tire body can be effectively prevented by air flow passing through the gaps between the blades provided between the sub-tires and the main tire body, thereby increasing air contacting area when the vehicle runs with a high speed or when the airplane lands. Pebbles or muddy water scattered inside and outside of the main tire body are caused to enter in between the sub-tires and blades, so that such muddy water or pebbles will not be scattered to pedestrians, other objects or the under surface of the vehicle per se.

Also, the degree of abrasion of the main tire body can be detected in accordance with the height of the outer peripheral surfaces of the sub-tires from the periphery of the main tire body so that the latter can be repaired, thus increasing the life span of the tire and permitting safe driving. The sub-tires can be provided integrally with the main tire body without requiring a large space, and therefore it is possible to form the main tire body and sub-tires by the use of a single mold at one stroke.

Meanwhile, treads may be also formed in the outer and inner peripheral surfaces and the ground contacting surfaces of the sub-tires.

What I claim is:

1. A tire comprising two sidewalls and a tread portion, wherein the improvement comprises a pair of sub-tires, each of which is integral with one of the sidewalls and has a continuous periphery the diameter of which is greater than the internal diameter of the tread portion, the lateral width of each sub-tire being not greater than the thickness of the sidewall, and the tread portion of the tire having a ground-contacting surface that extends across the full width of the tread portion between the sidewalls, the peripheral diameter of each sub-tire being less than that of said ground-contacting surface but being great enough so that during normal running of the tire at full inflation, deformation of the tire which occurs particularly in starting, stopping and negotiating curves brings the sub-tires into load-bearing contact with the ground.

References Cited

UNITED STATES PATENTS

| 2,340,258 | 1/1944 | Brunner | 152—352 |
| 1,272,664 | 7/1918 | Hummel et al. | 152—352 |
| 2,354,715 | 8/1944 | Tarbox | 152—211 |
| 3,065,995 | 11/1962 | Beacher | 152—312 |

FOREIGN PATENTS

| 194,940 | 3/1923 | Great Britain. |
| 271,471 | 8/1927 | Great Britain. |
| 310,264 | 4/1929 | Great Britain. |

ARTHUR L. LA POINT, Primary Examiner

CHARLES B. LYON, Assistant Examiner

U.S. Cl. X.R.

301—38